(12) United States Patent
Hanson

(10) Patent No.: US 6,877,639 B1
(45) Date of Patent: Apr. 12, 2005

(54) LIQUID MEASURING AND DISPENSING DEVICE

(76) Inventor: Tina R. Hanson, 12395 Tupelo La., Lake Wales, FL (US) 33898

(*) Notice: Subject to any disclaimer, the term of this patent is extended or adjusted under 35 U.S.C. 154(b) by 47 days.

(21) Appl. No.: 10/273,651

(22) Filed: Oct. 18, 2002

(51) Int. Cl.[7] ............................................... B67D 5/38
(52) U.S. Cl. ...................... 222/158; 222/205; 222/207; 222/321.7; 222/442
(58) Field of Search ................ 222/158, 205, 222/207, 321.7, 442, 481.5

(56) References Cited

U.S. PATENT DOCUMENTS

| | | | | |
|---|---|---|---|---|
| 2,730,270 A | * | 1/1956 | Heinemann | 222/205 |
| 2,761,833 A | * | 9/1956 | Ward | 210/85 |
| 4,105,142 A | * | 8/1978 | Morris, Jr. | 222/158 |
| 5,330,081 A | * | 7/1994 | Davenport | 222/207 |
| 5,833,124 A | * | 11/1998 | Groves et al. | 222/158 |
| 5,884,816 A | * | 3/1999 | Hinze | 222/158 |
| 6,015,067 A | * | 1/2000 | Lang et al. | 222/153.13 |
| 6,330,960 B1 | * | 12/2001 | Faughey et al. | 222/205 |

* cited by examiner

Primary Examiner—Joseph A. Kaufman

(57) ABSTRACT

Liquid measuring and dispensing devices measure and dispense a quantity of cooking oil or other liquids or flowable powders. The liquid measuring and dispensing device attaches directly to the bottle containing the material, eliminating the need to search for measuring instruments when one desires to measure a quantity of material. Because of the direct bottle attachment, it is impossible to spill the material during the measuring process. Furthermore, because the use of external measuring instruments is eliminated, there is no cleaning process required after measuring and dispensing a quantity of material.

5 Claims, 1 Drawing Sheet

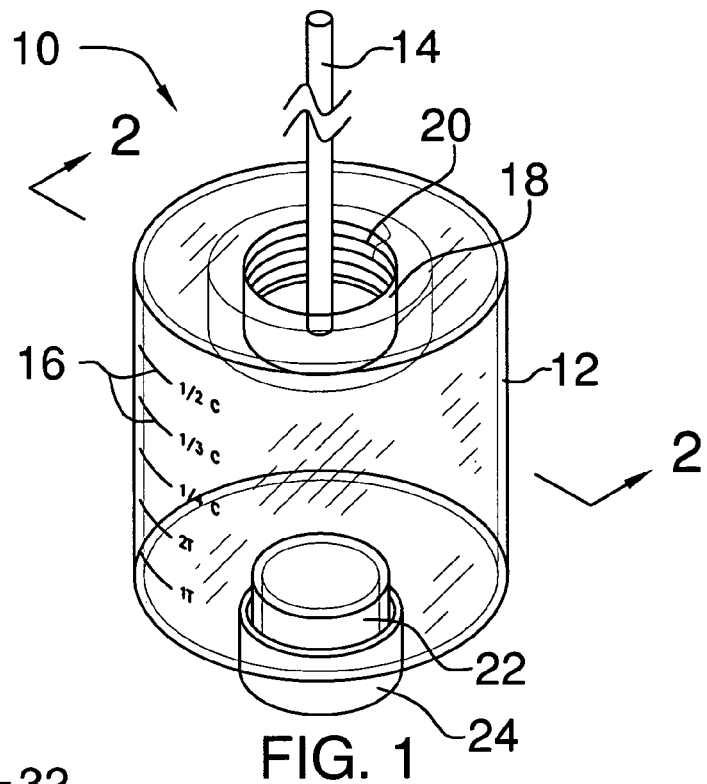
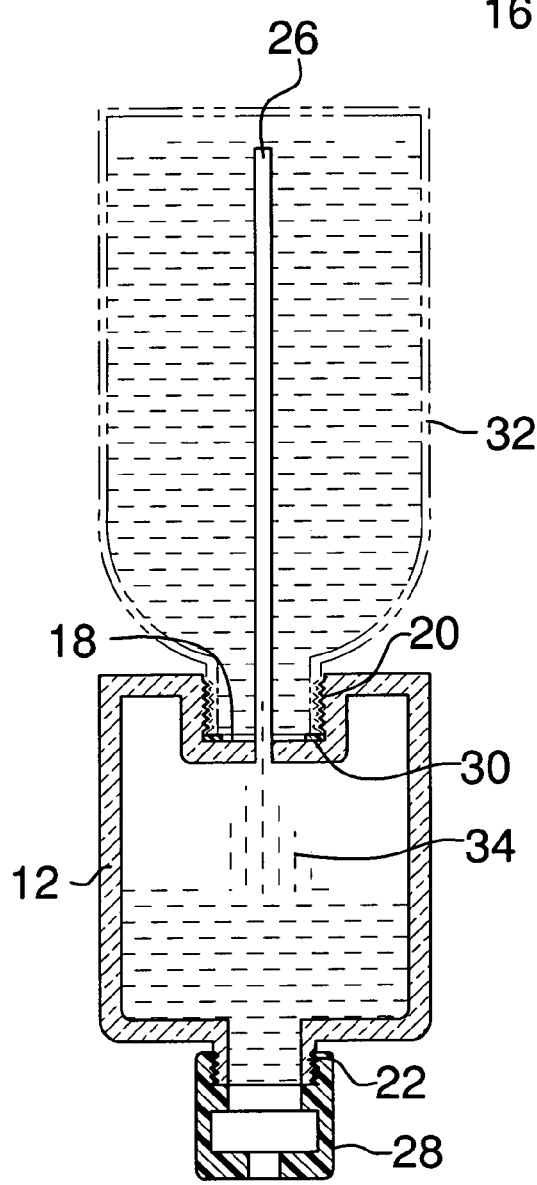
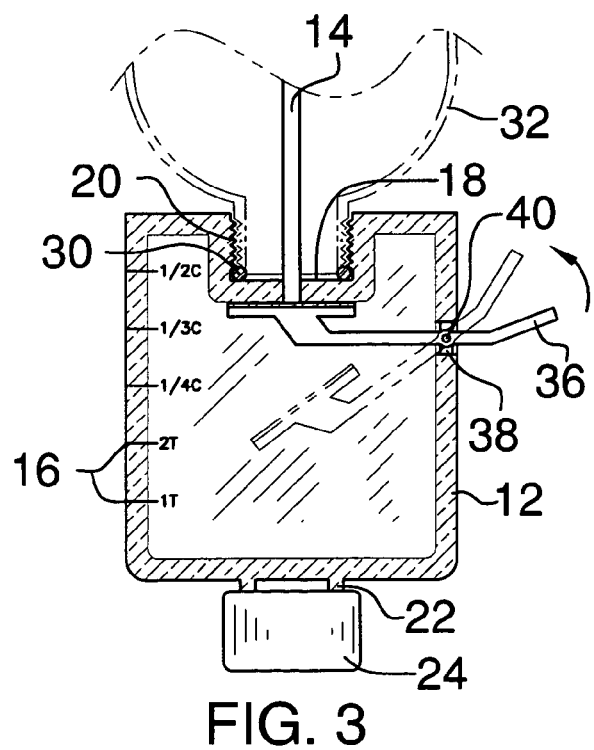
FIG. 1
FIG. 2
FIG. 3

LIQUID MEASURING AND DISPENSING DEVICE

BACKGROUND OF THE INVENTION

1. Field of the Invention

The present invention relates to a liquid measuring and dispensing device for use in connection with cooking. The liquid measuring and dispensing device has particular utility in connection with measuring and dispensing a quantity of cooking oil.

2. Description of the Prior Art

Liquid measuring and dispensing devices are desirable for measuring and dispensing a quantity of cooking oil. The liquid measuring and dispensing device attaches directly to the bottle of oil, eliminating the need to search for measuring instruments when one desires to measure a quantity of oil. Because of the direct bottle attachment, it is impossible to spill oil during the measuring process. Furthermore, because the use of external measuring instruments is eliminated, there is no cleaning process required after measuring and dispensing a quantity of oil.

The use of liquid dispensing systems is known in the prior art. For example, U.S. Pat. No. 5,044,527 to Hickerson discloses a liquid dispensing system. However, the Hickerson '527 patent does not allow the user to control the quantity of liquid or powdered material being dispensed, and has further drawbacks of lacking a pump.

U.S. Pat. No. 5,323,938 to Ceccarelli et al. discloses a pre-measured liquid and powder dispenser with overflow tube that dispenses a pre-measured amount of a liquid or a powdered material from a container. However, the Ceccarelli et al. '938 patent does not have a pump, and additionally does not allow the user to control the quantity of liquid or powdered material being dispensed.

Similarly, U.S. Pat. No. 5,584,420 to Awada et al. discloses a reusable and accurately pre-measured liquid dispenser that meters pre-measured quantities of liquid from a rigid wall or deformable walled container. However, the Awada et al. '420 patent does not have a pump, and cannot vary the quantity of liquid being dispensed.

In addition, U. S. Pat. No. Des. 302,521 to Grinde discloses a dual compartment container with measuring an indicator. However, the Grinde '521 patent does not have a pump, and also does not have a flap.

Furthermore, U.S. Pat. No. 5,556,011 to Jennings et al. discloses a measuring container that dispenses measured amounts of flowable solid material. However, the Jennings et al. '011 patent does not have a pump, and further lacks a flap.

Lastly, U.S. Pat. No. 5,542,579 to Robbins, III discloses a dispensing cap with internal measuring chamber and selectively usable sifter that attaches to an open, upper end of a container. However, the Robbins, III '579 patent does not have a pump, and has the additional deficiency of lacking a flap.

While the above-described devices fulfill their respective, particular objectives and requirements, the aforementioned patents do not describe a liquid measuring and dispensing device that allows measuring and dispensing a quantity of cooking oil. The Hickerson '527 patent, the Ceccarelli et al. '938 patent, the Awada et al. '420 patent, the Grinde '521 patent, the Jennings et al. '011, and the Robbins, III '579 patent make no provision for a pump. The Hickerson '527 patent, the Ceccarelli et al. '938 patent, and the Awada et al. '420 patent do not allow the user to control the quantity of material being dispensed. The Grinde '521 patent, the Jennings et al. '011, and the Robbins, III '579 patent lack a flap.

Therefore, a need exists for a new and improved liquid measuring and dispensing device that can be used for measuring and dispensing a quantity of cooking oil. In this regard, the present invention substantially fulfills this need. In this respect, the liquid measuring and dispensing device according to the present invention substantially departs from the conventional concepts and designs of the prior art, and in doing so provides an apparatus primarily developed for the purpose of measuring and dispensing a quantity of cooking oil.

SUMMARY OF THE INVENTION

In view of the foregoing disadvantages inherent in the known types of liquid dispensing systems now present in the prior art, the present invention provides an improved liquid measuring and dispensing device, and overcomes the above-mentioned disadvantages and drawbacks of the prior art. As such, the general purpose of the present invention, which will be described subsequently in greater detail, is to provide a new and improved liquid measuring and dispensing device which has all the advantages of the prior art mentioned heretofore and many novel features that result in a liquid measuring and dispensing device which is not anticipated, rendered obvious, suggested, or even implied by the prior art, either alone or in any combination thereof.

To attain this, the present invention essentially comprises a hollow dispenser with a bottle connector attached to one end and a dispensing tube attached to the other end with a cap removably attached to the dispenser tube. An alternative embodiment replaces the cap with a pump and attaches a pump tube to the hollow dispenser through the bottle connector.

There has thus been outlined, rather broadly, the more important features of the invention in order that the detailed description thereof that follows may be better understood and in order that the present contribution to the art may be better appreciated.

The invention may also include a flap that covers the bottle connector from the inside of the hollow dispenser. The flap can be rotated about a pivot pin mounted in a sidewall of the dispenser to uncover the bottle connector to allow the flow of liquid. Measuring markings may exist on the sidewall of the hollow dispenser. An air return tube may be attached to the hollow dispenser through the bottle connector in the first embodiment. The hollow dispenser may be cylindrical in shape, and may be made of a translucent plastic. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved liquid measuring and dispensing device that has all of the advantages of the prior art liquid dispensing systems and none of the disadvantages.

It is another object of the present invention to provide a new and improved liquid measuring and dispensing device that may be easily and efficiently manufactured and marketed.

An even further object of the present invention is to provide a new and improved liquid measuring and dispensing device that has a low cost of manufacture with regard to both materials and labor, and which accordingly is then susceptible of low prices of sale to the consuming public, thereby making such liquid measuring and dispensing device economically available to the buying public.

Still another object of the present invention is to provide a new liquid measuring and dispensing device that provides in the apparatuses and methods of the prior art some of the advantages thereof, while simultaneously overcoming some of the disadvantages normally associated therewith.

Even still another object of the present invention is to provide a liquid measuring and dispensing device for measuring and dispensing a quantity of cooking oil. This allows the user to measure a quantity of cooking oil without risk of spillage.

Still yet another object of the present invention is to provide a liquid measuring and dispensing device for measuring and dispensing a quantity of cooking oil. This makes it possible to vary the amount of cooking oil to be dispensed.

An additional object of the present invention is to provide a liquid measuring and dispensing device for measuring and dispensing a quantity of cooking oil. This eliminates the need to clean external measuring devices.

A further object of the present invention is to provide a liquid measuring and dispensing device for measuring and dispensing a quantity of cooking oil. This makes the liquid measuring and dispensing device easily accessible at all times.

A still further object of the present invention is to provide a liquid measuring and dispensing device for measuring and dispensing a quantity of cooking oil. This allows the user to draw liquid into the measuring and dispensing device without inverting the attached bottle.

Lastly, it is an object of the present invention to provide a new and improved liquid measuring and dispensing device for measuring and dispensing a quantity of cooking oil.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top perspective view of the current embodiment of the liquid measuring and dispensing device constructed in accordance with the principles of the present invention.

FIG. 2 is a side sectional view of an alternative embodiment of the liquid measuring and dispensing device of the present invention.

FIG. 3 is a side sectional view of the liquid measuring and dispensing device of the present invention.

The same reference numerals refer to the same parts throughout the various figures.

DESCRIPTION OF THE CURRENT EMBODIMENT

Referring now to the drawings, and particularly to FIGS. 1–3, a current embodiment of the liquid measuring and dispensing device of the present invention is shown and generally designated by the reference numeral 10.

In FIG. 1, a new and improved liquid measuring and dispensing device 10 of the present invention for measuring and dispensing a quantity of cooking oil is illustrated and will be described. More particularly, the liquid measuring and dispensing device 10 has a hollow dispenser 12. In the current embodiment, hollow dispenser 12 is cylindrical in shape and made of a translucent plastic. A translucent plastic is chosen so that the quantity of liquid inside of hollow dispenser 12 can be viewed. Attached at the base of hollow dispenser 12 is air return tube 14 made of plastic. Air return tube 14 transfers air displaced by the liquid entering hollow dispenser 12 to the bottom of a container from which a liquid is being transferred. This prevents pressure from building up in hollow dispenser 12 or a vacuum from forming in the bottom of the container from which the liquid is being transferred. Either of these conditions would prevent the liquid from entering hollow dispenser 12. Measurement markings 16 are present on the sidewall of hollow dispenser 12 so that the amount of liquid present in hollow dispenser 12 can be easily determined. Measurement markings for 1 tbsp., 2 tbsp., ¼ cup, ⅓ cup, and ½ are present in the current embodiment. Molded into the base of hollow dispenser 12 is bottle receiver 18 with threads 20. This allows hollow dispenser 12 to be threadedly attached to the container from which the liquid is being transferred. A dispensing tube 22 with removably attached cap 24 is molded at the top of hollow dispenser 12 and is used to empty hollow dispenser 12 once a desired amount of liquid is present. In the current embodiment, cap 24 is threadedly attached to dispenser tube 22.

Moving on to FIG. 2, an alternative embodiment of a new and improved liquid measuring and dispensing device 10 of the present invention for measuring and dispensing a quantity of cooking oil is illustrated and will be described. More particularly, the dispensing tube has a pump 28 threadedly attached at the top of dispensing tube 22. The pump removes air from hollow dispenser 12 when it is depressed, thereby creating a vacuum in hollow dispenser 12. As a result, oil 34 is sucked from bottle of oil 32 by pump tube 26. Bottled oil 32 is shown threadedly attached to threads 20 in bottle receiver 18. O-ring 30 ensures a leakproof seal between bottle of oil 32 and hollow dispenser 12. O-ring 30 is made of rubber in the current embodiment.

Concluding with FIG. 3, a new and improved liquid measuring and dispensing device 10 of the present invention for measuring and dispensing a quantity of cooking oil is illustrated and will be described. More particularly, the hollow dispenser 12 with measurement markings 16 and cap 24 is threadedly attached to bottle of oil 32 by threads 20 in bottle receiver 18. O-ring 30 is present to provide a leak-proof seal between bottle of oil 32 and hollow dispenser 12. Flap 36 is rotatably mounted on pivot pin 40. Pivot pin 40 is embedded in the sidewall of hollow dispenser 12. Broken lines denote the rotatable motion capability of flap 36. Seal 38 insurers that liquid cannot escape from around pivot pin 40. By rotating flap 36, liquid can flow from bottle of oil 32 into hollow dispenser 12.

In use, it can now be understood that the liquid measuring and dispensing device 10 is screwed on to the top of bottle of oil 32. Bottle of oil 32 is held in place by threads 20 in bottle receiver 18. A leakproof seal is insured by the presence of O-ring 30 between bottle of oil 32 and hollow dispenser 12. Oil 34 is dispensing into hollow dispenser 12 by either the rotation of flap 36 or the use of pump 28, depending on which is present. Measurement markings 16 are used to monitor the amount of oil 34 being dispensed into hollow dispenser 12. Once the desired amount of oil 34 is present in hollow dispenser 12, cap 24 or pump 28, whichever is present, is removed from hollow dispenser 12, and oil 34 contained within hollow dispenser 12 can be poured out. At that point, cap 24 pump 28, whichever is present, is reattached to hollow dispenser 12 and the liquid measuring and dispensing device 10 is ready for reuse or storage.

While a current embodiment of the liquid measuring and dispensing device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, glass or transparent plastic may be used instead of the translucent plastic hollow dispenser described. Also, the rubber O-ring may be made of plastic. And although measuring and dispensing a quantity of cooking oil have been described, it should be appreciated that the liquid measuring and dispensing device herein described is also suitable for measuring and dispensing any liquid or flowable powder. Furthermore, a wide variety of cap attachment means may be used instead of the threaded attachment described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A liquid measuring and dispensing device comprising:
a hollow dispenser with sidewalls and opposing ends;
a bottle connector attached to one end of said dispenser;
a dispensing tube having opposing ends with one end attached to said opposing end of said hollow dispenser;
a cap removably attached to said opposing end of said dispensing tube;
a flap rotatably mounted in said sidewall of said hollow dispenser;
a pivot pin inserted through said flap; and
a seal mounted in said sidewall of said hollow dispenser.

2. A liquid measuring and dispensing device comprising:
a hollow dispenser with sidewalls and opposing ends;
a bottle connector attached to one end of said dispenser;
a pump tube attached to said end of said dispenser and inserted through said bottle connector;
a dispensing tube having opposing ends with one end attached to said opposing end of said dispenser;
a pump removably attached to said opposing end of said dispensing tube;
a flap rotatably mounted in said sidewall of said hollow dispenser;
a pivot pin inserted through said flap; and
a seal mounted in said sidewall of said hollow dispenser.

3. A liquid measuring and dispensing device comprising:
a hollow dispenser with sidewalls and opposing ends;
a bottle connector attached to one end of said dispenser;
a pump tube attached to said end of said dispenser and inserted through said bottle connector;
a pump attached to said opposing end of said dispenser;
a flap rotatably mounted in said sidewall of said hollow dispenser;
a pivot pin inserted through said flap; and
a seal mounted in said sidewall of said hollow dispenser.

4. The bottle connector as defined in claim 3, wherein said bottle connector comprises:
a bottle receiver having a sidewall wherein said hollow receiver comprises an indentation therein to comprise said bottle receiver;
threads on said sidewall of said bottle receiver; and
an O-ring attached to said end of said hollow dispenser.

5. The liquid measuring and dispensing device as defined in claim 3, further comprising measurement markings on said sidewall of said hollow dispenser.

* * * * *